INVENTOR.
KLAUS G. SCHROEDER

INVENTOR.
KLAUS G. SCHROEDER
BY Harry A. Herbert Jr.
Sherman H. Goldman
ATTORNEYS

United States Patent Office 3,380,058
Patented Apr. 23, 1968

3,380,058
NEAR SIDELOBE SUPPRESSION IN A SINGLE-RING DIRECTIONAL ARRAY WITH HORIZONTAL BEAM DIRECTION
Klaus G. Schroeder, Dallas, Tex., assignor to the United States of America as represented by the Secretary of the Air Force
Filed Nov. 10, 1965, Ser. No. 507,261
2 Claims. (Cl. 343—844)

This invention relates generally to antennas and more particularly to a single-ring directional array with horizontal beam direction.

Single-ring, directional, circular antenna arrays generally have a first sidelobe in azimuth of approximately 8 db below the main beam level when the beam is pointed in a horizontal direction with uniform excitation of the elements. This sidelobe is equivalent to the second maximum of the zeroth order Bessel function of the first kind.

Previous modes for reducing sidelobes in circular arrays required the maintenance of control of the amplitude of the excitation by decreasing the amplitude at the edges of what would be the horizontal projection of the elements of the array. This solution requires the use of an expensive, complex transmission line arrangement.

It has been found that the sidelobe can be regarded as being caused by nonuniform elements spacing in the projection of the array; the elements in the center being spaced further apart than the edge elements. This nonuniformity may be eliminated, thereby making the projection uniform such that first sidelobes, similar to those of a linear broadside array, can be achieved with the level being 50 db down from the main beam.

Accordingly, it is a primary object of this invention to provide for near sidelobe suppression in a single-ring directional array with horizontal beam direction.

It is another object of this invention to provide a single-ring directional array with nonuniform radiator spacing.

It is still another object of this invention to provide a circular array with low sidelobes which do not require complicated transmission line arrangements.

It is a further object of this invention to provide a single-ring directional array having nonuniformly spaced radiators which avoid the requirement for varying the amplitude to the separate radiators in order to provide near sidelobe suppression.

It is a still further object of this invention to provide near sidelobe suppression in a single-ring directional array by means of apparatus which is easy and economical to produce of conventional, currently available materials that lend themselves to mass production manufacturing techniques.

Figure 1:
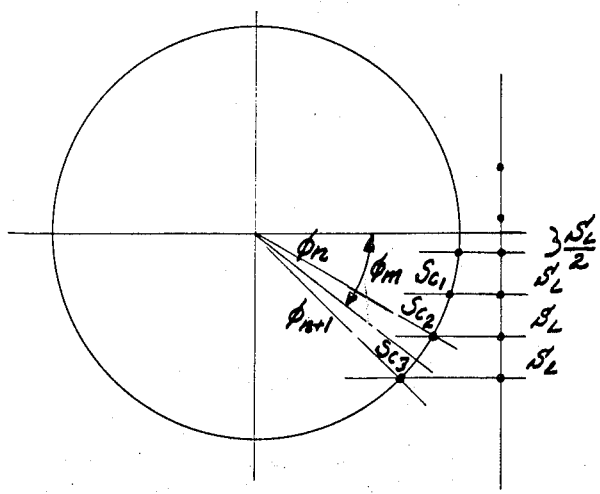
Figure 2:
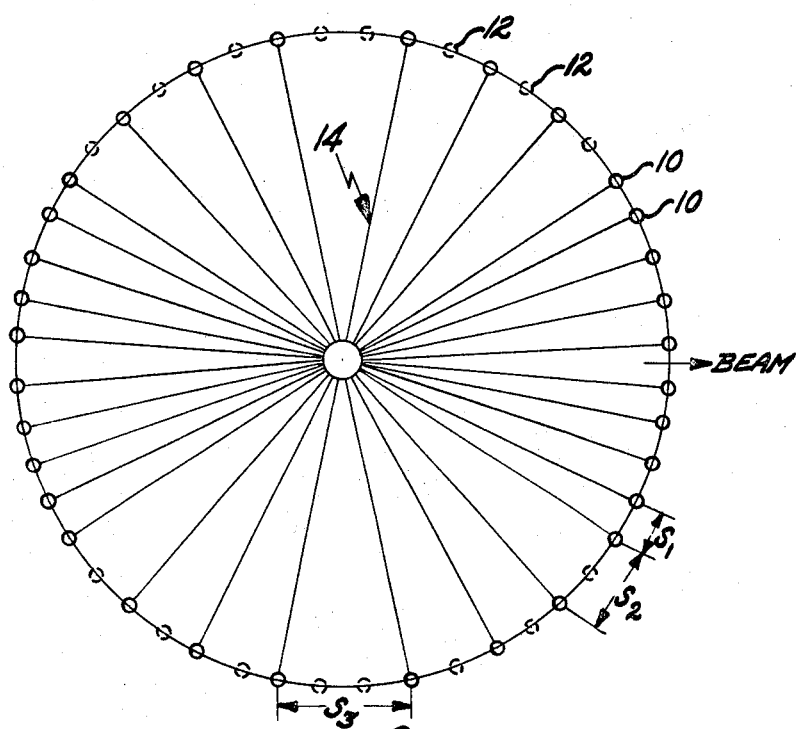
Figure 3:
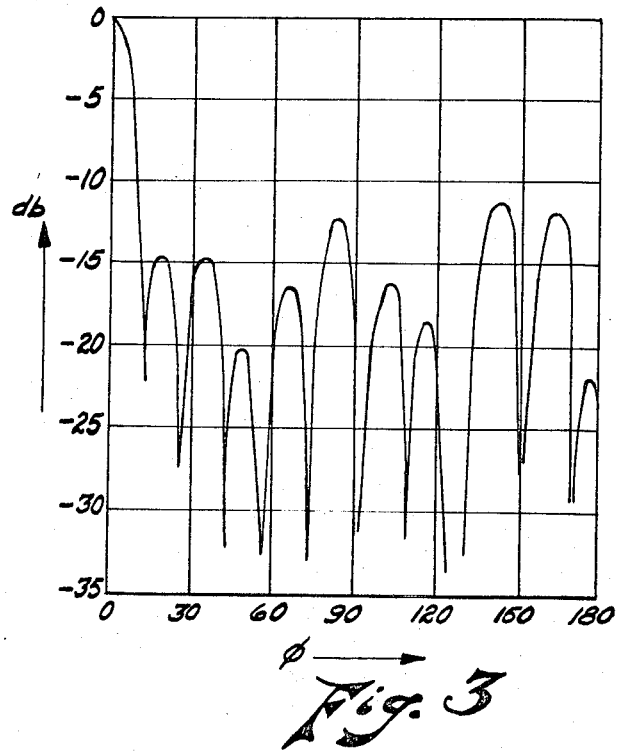
Figure 4:
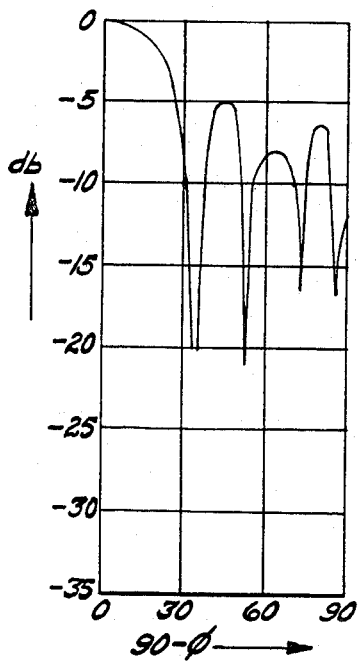

These and other advantages, features and objects of the invention will become more apparent from the following description taken in connection with the illustrative embodiments in the accompanying drawings, wherein:

FIGURE 1 is a schematic representation of the linear projection of a part of a circular array in order to provide a reference for illustrating the mathematics of radiator spacing;

FIGURE 2 is a plan view of a nonuniform circular array which, in order to provide near sidelobe suppression, utilizes only 32 elements out of a possible total of 48, the radiator elements omitted being shown in phantom; and FIGURES 3 and 4 are computed radiation azimuth and elevation patterns, respectively, of a 32 isotropic element array with equal amplitude and cophasal excitation on the elements.

Referring to FIGURE 1, there is shown a circular array with only a few of the elements thereon in order to provide a pictorial explanation of the mathematics involving the theory of this invention.

In order to establish uniform element spacing in the linear projection of the circular array with symmetrical feed structure, the element spacing within the ring has to be $$S_c = S_L \sec \phi_m \pm \Delta S(\phi)$$

where $S_c$ = requiring circular spacing,
$S_L$ = desired (uniform linear) spacing,
$\phi_m$ = mean angle off broadside, and
$\Delta S(\phi)$ = corrective term, if additional first sidelobe suppression is desired.

The circular spacing can either be determined geometrically, or by using:

$$\phi_m = \frac{\phi_n + \phi_{n+1}}{2}$$

with $$\phi_n = \sin^{-1}\left[\frac{(n-1)}{R}S_L\right] \quad \begin{matrix} 0 \leq nS_L \leq R \\ n=1, 2, 3, \ldots \frac{N-1}{2} \\ N \text{ odd} \end{matrix}$$

$$\phi_{n+1} = \sin^{-1}\left[\frac{nS_L}{R}\right]$$

$$\phi_n = \sin^{-1}\left[\frac{(n-\frac{1}{2})S_L}{R}\right] \quad \begin{matrix} 0 \leq nS_L \leq R \\ n=1, 2, 3, \ldots \frac{N}{2} \\ n \text{ even} \end{matrix}$$

$$\phi_{n+1} = \sin^{-1}\left[\frac{(n+\frac{1}{2})S_L}{R}\right]$$

where $R$ = radius of array, and
$N$ = number of elements in the linear projection.

Referring to FIGURE 2, there is shown a representation of an array which illustrates a practical embodiment of the previously described theory. In a practical case the circular spacings are predetermined if the inherent 360° coverage of the circular array is to be preserved. The available circular spacings then become multiples of the chosen minimum spacing. The larger number of elements that there are in an array, the better will be the approximation of the ideal circular spacing. The thirty-two elements forming the array are designated with the numeral 10 and are shown in solid lines in FIGURE 2. These radiators are usually monopoles, although dipoles may be utilized, which are equally and cophasally excited with the spacing of the radiators being such that the projection of their separations on a line perpendicular to the arrow designating beam direction would tend to produce substantially uniform spacing along the line.

Azimuth and elevation patterns for the array of FIGURE 2 are shown in FIGURES 3 and 4, respectively. These figures are radiation patterns which are calculated using equal amplitude and cophasal excitation of the elements. It is assumed that the thirty-two chose elements are isotropic and are placed on a circle of $4\lambda$ diameter. The nonuniform element spacing utilized was a multiple of a $2.6\lambda$. Thus, the array of FIGURE 2 becomes one with thirty-two elements 10 selected out of a possible total of 48. The monopole elements which were not selected are shown in phantom and are designated with the numeral 12 which causes the resultant circular spacing to be $S_1=0.26\lambda$; $S_2=0.52\lambda$; and, $S_3=0.78\lambda$. Because the elements are equally and cophasally excited, a conventional transmission line feed 14 may be utilized rather than one requiring variations in these parameters.

From the patterns illustrated in FIGURES 3 and 4, it can be seen that the effects of mutual coupling between the elements are the same as in any other array for the elements with spacing $S_1$ and are much smaller with elements with spacings of $S_2$ and $S_3$. Since the latter elements have a much larger variation in excitation phase, the mutual coupling between them would have a strong effect on the actual radiation patterns. The reduction of these mutual couplings comprise an important feature of the array.

Thus, there has been shown a novel antenna apparatus and a method for determining an antenna structure which comprises a single-ring circular array of nonuniform elements in order to produce near sidelobe suppression with horizontal beam direction.

Although the invention has been described with reference to a particular embodiment, it will be understood to those skilled in the art that the invention is capable of a variety of alternative embodiments within the spirit and scope of the appended claims.

I claim:
1. A single-ring circular array comprising
   a series of radiating elements arranged in a single plane to form a circle,
   the spacing of said radiators being such that the projection of their separations on a line tend to produce substantially uniform spacing along the line, and
   means for equally and cophasally exciting said radiators.
2. An array as defined in claim 1 wherein said elements comprise monopoles.

References Cited

UNITED STATES PATENTS 2,126,531   8/1938   Carter _____ 343—844

ELI LIEBERMAN, *Primary Examiner.*